(12) United States Patent
Davis

(10) Patent No.: US 7,429,803 B2
(45) Date of Patent: Sep. 30, 2008

(54) SEWER LINE POWER GENERATING SYSTEM

(76) Inventor: Rufus Davis, 1535 N. Post Oak, Houston, TX (US) 77055

( * ) Notice: Subject to any disclaimer, the term of this patent is extended or adjusted under 35 U.S.C. 154(b) by 0 days.

(21) Appl. No.: 11/461,733

(22) Filed: Aug. 1, 2006

(65) Prior Publication Data

US 2007/0182159 A1    Aug. 9, 2007

Related U.S. Application Data

(60) Provisional application No. 60/704,501, filed on Aug. 1, 2005.

(51) Int. Cl.
*F03B 13/00* (2006.01)
*H02P 9/04* (2006.01)
*F03B 13/10* (2006.01)
*F03B 13/12* (2006.01)

(52) U.S. Cl. .............................. 290/54; 290/53; 290/43

(58) Field of Classification Search .................... 290/43, 290/53–54
See application file for complete search history.

(56) References Cited

U.S. PATENT DOCUMENTS

| 1,010,609 | A |   | 12/1911 | Fountain ........................ 405/75 |
| 2,029,633 | A | * | 2/1936  | Muhleisen ................. 73/861.75 |
| 2,097,286 | A | * | 10/1937 | McGee ........................... 290/54 |
| 2,276,714 | A | * | 3/1942  | Brown ........................... 415/203 |
| 2,600,309 | A | * | 6/1952  | MacDonald et al. ... 200/81.9 M |
| 3,188,421 | A | * | 6/1965  | Rowell ..................... 200/81.9 R |
| 3,199,488 | A | * | 8/1965  | Farr .............................. 116/276 |
| 3,224,270 | A | * | 12/1965 | Karol et al. ................ 73/861.56 |
| 3,251,335 | A | * | 5/1966  | Dannevik ..................... 116/275 |
| 3,372,645 | A | * | 3/1968  | Willi ............................... 415/1 |
| 3,443,753 | A | * | 5/1969  | McDonnell .................... 239/27 |
| 3,559,197 | A | * | 1/1971  | Jarvis et al. .................. 340/610 |
| 3,565,099 | A | * | 2/1971  | Huber ........................ 137/269.5 |
| 3,745,967 | A | * | 7/1973  | Smith et al. .................. 116/275 |
| 3,803,422 | A | * | 4/1974  | Krickler ........................ 290/52 |
| 3,857,277 | A | * | 12/1974 | Moore ........................ 73/861.74 |

(Continued)

FOREIGN PATENT DOCUMENTS

BG            0106669           9/2002

(Continued)

OTHER PUBLICATIONS

"Hydroelectric Sewer Power Generation", online <http://www.halfbakery.com/idea/Hydroelectric_20Sewer_20Power_20Generation>, Feb. 6, 2004.

(Continued)

*Primary Examiner*—Darren Schuberg
*Assistant Examiner*—Pedro J Cuevas
(74) *Attorney, Agent, or Firm*—Fulbright & Jaworski, LLP

(57) ABSTRACT

The sewer line power generating system is designed to be positioned within a manhole. The system generates electricity from water flowing through sewer lines. The system includes a hydro turbine that can be raised and lowered into water flowing through sewer lines. They system also includes a flow control plate that accelerates and directs the water for optimal power generation. The system further includes an actuator that raises and lowers the system in response to the water flow. The system further includes a pressure gauge to measure water pressure at the turbine and adjust the position of the turbine in response to the water pressure.

15 Claims, 2 Drawing Sheets

U.S. PATENT DOCUMENTS

| | | | | |
|---|---|---|---|---|
| 3,914,994 | A * | 10/1975 | Banner | 72/118.1 |
| 3,955,415 | A * | 5/1976 | Sharon | 73/861.74 |
| 4,023,041 | A * | 5/1977 | Chappell | 290/53 |
| 4,057,736 | A | 11/1977 | Jeppson | 307/78 |
| 4,122,381 | A | 10/1978 | Sturm | 320/128 |
| 4,134,024 | A | 1/1979 | Wiseman | 290/52 |
| 4,137,005 | A * | 1/1979 | Comstock | 415/24 |
| 4,208,873 | A | 6/1980 | Foglia | 60/398 |
| 4,239,976 | A * | 12/1980 | Collard | 290/42 |
| 4,241,283 | A * | 12/1980 | Storer, Sr. | 290/54 |
| 4,246,753 | A * | 1/1981 | Redmond | 60/398 |
| 4,272,686 | A | 6/1981 | Suzuki | 290/54 |
| 4,274,436 | A * | 6/1981 | Smith | 137/515.7 |
| 4,302,683 | A * | 11/1981 | Burton | 290/4 R |
| 4,351,192 | A * | 9/1982 | Toda et al. | 73/861.18 |
| 4,352,025 | A | 9/1982 | Troyen | 290/54 |
| 4,383,797 | A * | 5/1983 | Lee | 415/7 |
| 4,435,131 | A * | 3/1984 | Ruben | 417/334 |
| 4,443,707 | A | 4/1984 | Scieri et al. | 290/4 R |
| 4,467,218 | A * | 8/1984 | Andruszkiw et al. | 290/54 |
| 4,484,536 | A * | 11/1984 | Henocque et al. | 116/275 |
| 4,488,055 | A * | 12/1984 | Toyama | 290/53 |
| 4,496,845 | A | 1/1985 | Ensign et al. | 290/43 |
| 4,499,347 | A * | 2/1985 | Richards | 200/81.9 M |
| 4,615,303 | A * | 10/1986 | Sackett | 123/41.15 |
| 4,620,448 | A * | 11/1986 | Oblander et al. | 73/861.71 |
| 4,717,831 | A * | 1/1988 | Kikuchi | 290/53 |
| 4,731,545 | A * | 3/1988 | Lerner et al. | 290/54 |
| 4,740,711 | A | 4/1988 | Sato et al. | 290/52 |
| 4,777,979 | A * | 10/1988 | Twerdochlib | 137/554 |
| 4,918,369 | A | 4/1990 | Solorow | 322/35 |
| 4,923,368 | A * | 5/1990 | Martin | 415/202 |
| 4,963,780 | A * | 10/1990 | Hochstrasser | 310/104 |
| 5,007,241 | A * | 4/1991 | Saitou | 60/698 |
| 5,008,841 | A | 4/1991 | McElroy | 702/39 |
| 5,043,592 | A * | 8/1991 | Hochstrasser | 290/52 |
| 5,099,870 | A * | 3/1992 | Moore et al. | 137/71 |
| 5,140,254 | A * | 8/1992 | Katzman | 322/35 |
| 5,236,011 | A * | 8/1993 | Casada et al. | 137/554 |
| 5,253,651 | A * | 10/1993 | Stockwell et al. | 600/538 |
| 5,337,956 | A * | 8/1994 | Crutcher | 239/27 |
| 5,427,350 | A * | 6/1995 | Rinkewich | 251/30.01 |
| 5,430,332 | A * | 7/1995 | Dunn, Jr. | 290/54 |
| 5,440,175 | A * | 8/1995 | Mayo et al. | 290/54 |
| 5,591,004 | A * | 1/1997 | Aylor | 416/42 |
| 5,644,170 | A * | 7/1997 | Bynum et al. | 290/43 |
| 5,743,712 | A * | 4/1998 | Aylor | 416/42 |
| 5,882,143 | A | 3/1999 | Williams, Jr. | 405/78 |
| 5,970,801 | A * | 10/1999 | Ciobanu et al. | 73/861.52 |
| 6,032,540 | A * | 3/2000 | Hawkins | 73/861.75 |
| 6,036,333 | A * | 3/2000 | Spiller | 362/192 |
| 6,106,705 | A * | 8/2000 | Giordano et al. | 210/87 |
| 6,112,764 | A * | 9/2000 | Engdahl et al. | 137/554 |
| 6,114,773 | A * | 9/2000 | Kouris | 290/52 |
| 6,114,823 | A * | 9/2000 | Doner et al. | 340/610 |
| 6,149,801 | A * | 11/2000 | Giordano et al. | 210/87 |
| 6,164,324 | A * | 12/2000 | Gradle | 137/554 |
| 6,177,735 | B1 * | 1/2001 | Chapman et al. | 290/44 |
| 6,208,037 | B1 * | 3/2001 | Mayo et al. | 290/54 |
| 6,212,958 | B1 * | 4/2001 | Conley | 73/861.74 |
| 6,284,129 | B1 * | 9/2001 | Giordano et al. | 210/87 |
| 6,309,179 | B1 | 10/2001 | Holden | 415/202 |
| 6,417,578 | B1 * | 7/2002 | Chapman et al. | 290/44 |
| 6,509,652 | B2 | 1/2003 | Yumita et al. | 290/54 |
| 6,517,707 | B2 * | 2/2003 | Giordano et al. | 210/87 |
| 6,559,553 | B2 * | 5/2003 | Yumita et al. | 290/54 |
| 6,571,960 | B2 * | 6/2003 | Williamson et al. | 210/420 |
| 6,606,857 | B1 | 8/2003 | Simonds | 60/398 |
| 6,768,218 | B2 * | 7/2004 | Yumita | 290/54 |
| 6,798,080 | B1 * | 9/2004 | Baarman et al. | 290/43 |
| 6,858,950 | B1 * | 2/2005 | Simon | 290/1 R |
| 6,876,100 | B2 * | 4/2005 | Yumita | 290/54 |
| 6,885,114 | B2 * | 4/2005 | Baarman et al. | 290/43 |
| 6,926,821 | B2 * | 8/2005 | Giordano et al. | 210/87 |
| 6,927,501 | B2 * | 8/2005 | Baarman et al. | 290/43 |
| 7,067,936 | B2 * | 6/2006 | Baarman et al. | 290/43 |
| 7,075,190 | B1 * | 7/2006 | Lomerson et al. | 290/53 |
| 7,119,451 | B2 * | 10/2006 | Baarman et al. | 290/43 |
| 7,121,495 | B2 * | 10/2006 | Caamano | 242/390.5 |
| 7,190,088 | B2 * | 3/2007 | Heidel | 290/54 |
| 7,199,483 | B2 * | 4/2007 | Lomerson et al. | 290/53 |
| 7,233,078 | B2 * | 6/2007 | Baarman et al. | 290/43 |
| 7,252,757 | B2 * | 8/2007 | Warren et al. | 210/87 |
| 7,338,267 | B2 * | 3/2008 | Patterson | 418/268 |
| 2001/0022085 | A1 | 9/2001 | Stewart | 60/641.2 |
| 2001/0040121 | A1 * | 11/2001 | Giordano et al. | 210/87 |
| 2002/0005379 | A1 * | 1/2002 | Williamson et al. | 210/433.1 |
| 2002/0041100 | A1 * | 4/2002 | Yumita et al. | 290/52 |
| 2002/0047374 | A1 * | 4/2002 | Yumita | 310/81 |
| 2002/0113442 | A1 * | 8/2002 | Yumita | 290/54 |
| 2002/0180216 | A1 | 12/2002 | McDavid | 290/59 |
| 2003/0046931 | A1 | 3/2003 | Stewart | 60/641.2 |
| 2003/0218338 | A1 | 11/2003 | O'Sullivan et al. | 290/43 |
| 2004/0069696 | A1 * | 4/2004 | Warren et al. | 210/97 |
| 2007/0098542 | A1 * | 5/2007 | Streeman et al. | 415/4.2 |
| 2007/0138021 | A1 * | 6/2007 | Nicholson | 205/628 |

FOREIGN PATENT DOCUMENTS

| | | |
|---|---|---|
| WO | WO-83/04425 | 12/1983 |
| WO | WO-97/01018 | 1/1997 |
| WO | WO-02/10553 | 2/2002 |
| WO | WO-03/083290 | 10/2003 |

OTHER PUBLICATIONS

Cunningham et al., "Micro Hydropower in the Nineties", online http://www.elements.nb.ca/theme/energy/micro/micro.htm , May 1998, Jan. 7, 2004.

International Search Report, issued Sep. 25, 2007 re International Application No. PCT/US06/29785, WO 2007/016505 A3.

* cited by examiner

SEWER LINE POWER GENERATING SYSTEM

CROSS-REFERENCE TO RELATED APPLICATIONS

This application claims priority to Provisional Application No. 60/704,501.

TECHNICAL FIELD

The present invention relates to a power generating system configured to generate electricity from hydro energy in sewer lines. The novel system is sized and shaped to fit within manholes. The system includes a hydro turbine that can be raised and lowered into the water flowing through the sewer. They system also includes a flow control plate that accelerates and directs the water for optimal power generation.

BRIEF SUMMARY OF THE INVENTION

One embodiment of the present invention is directed to a sewer line hydro power generator system includes a flow control plate shaped to be received in a sewer line, wherein the flow control plate includes a flow control channel, a hydro turbine connected to the flow control plate and positioned relative to the flow control channel, and an alternator connected to the hydro turbine. The system may also include an attachment hinge connected to the flow control plate. The flow control plate may be configured to pivot about the attachment hinge in response to the force exerted by water flowing through a sewer line. The system may be set up so that the water force needed to pivot the flow control plate remains constant.

The sewer line hydro power generator system may also include a pivot spring attached to the attachment hinge and the flow control plate.

The alternator of the system may also be attached to the flow control plate. The hydro turbine includes turbine blades. The flow control plate may have a width that is substantially equal to the diameter of a sewer pipe.

Another embodiment of the sewer line hydro power generator system includes a turbine shaft housing with an upper end and a lower end, a hydro turbine connected to the lower end of the turbine shaft housing, an alternator connected to the upper end of the turbine shaft housing, and a flow control plate with an up-steam side and a down-stream side, wherein the hydro turbine is positioned on the down-stream side of the flow control plate. The system may further include a means for collecting data about water flow. The system may further include an actuator configured to raise and lower the hydro turbine. The system may further include a pressure sensor mounted on the flow control plate. The hydro turbine may include turbine blades sized to fit within the diameter of a sewer pipe.

The system may also include a flow control plate with a flow channel and a hydro turbine positioned relative to the flow channel. The flow control plate may also be pivotally attached to an attachment hinge. The system may include a turbine blades/sewer pipe clearance of approximately ¼ inch. The turbine blades may also be shaped to match the curvature of the sewer pipe. The turbine shaft housing may also be sized such that at its maximum extension the turbine blades are not in the water during normal sewer flow rates.

The foregoing has outlined rather broadly the features and technical advantages of the present invention in order that the detailed description of the invention that follows may be better understood. Additional features and advantages of the invention will be described hereinafter which in addition to the above form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention together with further objects and advantages will be better understood from the following description when considered in connection with the accompanying figures. It is to be expressly understood, however, that each of the figures are provided for the purpose of illustration and description only and are not intended to define of the limits of the present invention.

BRIEF DESCRIPTION OF THE DRAWINGS

The advantages, features, and details of the invention are explained in greater detail in the following description of the preferred embodiment, with the aid of drawings as listed below. For a more complete understanding of the present invention, reference is now made to the following descriptions taken in conjunction with the accompanying drawing, in which.

DETAILED DESCRIPTION OF THE INVENTION

Upon review of the detailed description and the accompanying drawings provided herein, it will be apparent to one of ordinary skill in the art that the sewer power generating system can be used in a number of different applications. Accordingly, the present invention is not limited to the structures specifically described and illustrated herein. The disclosed systems, however, are particularly adapted for generating power from water flow in sewers.

Figure 1:
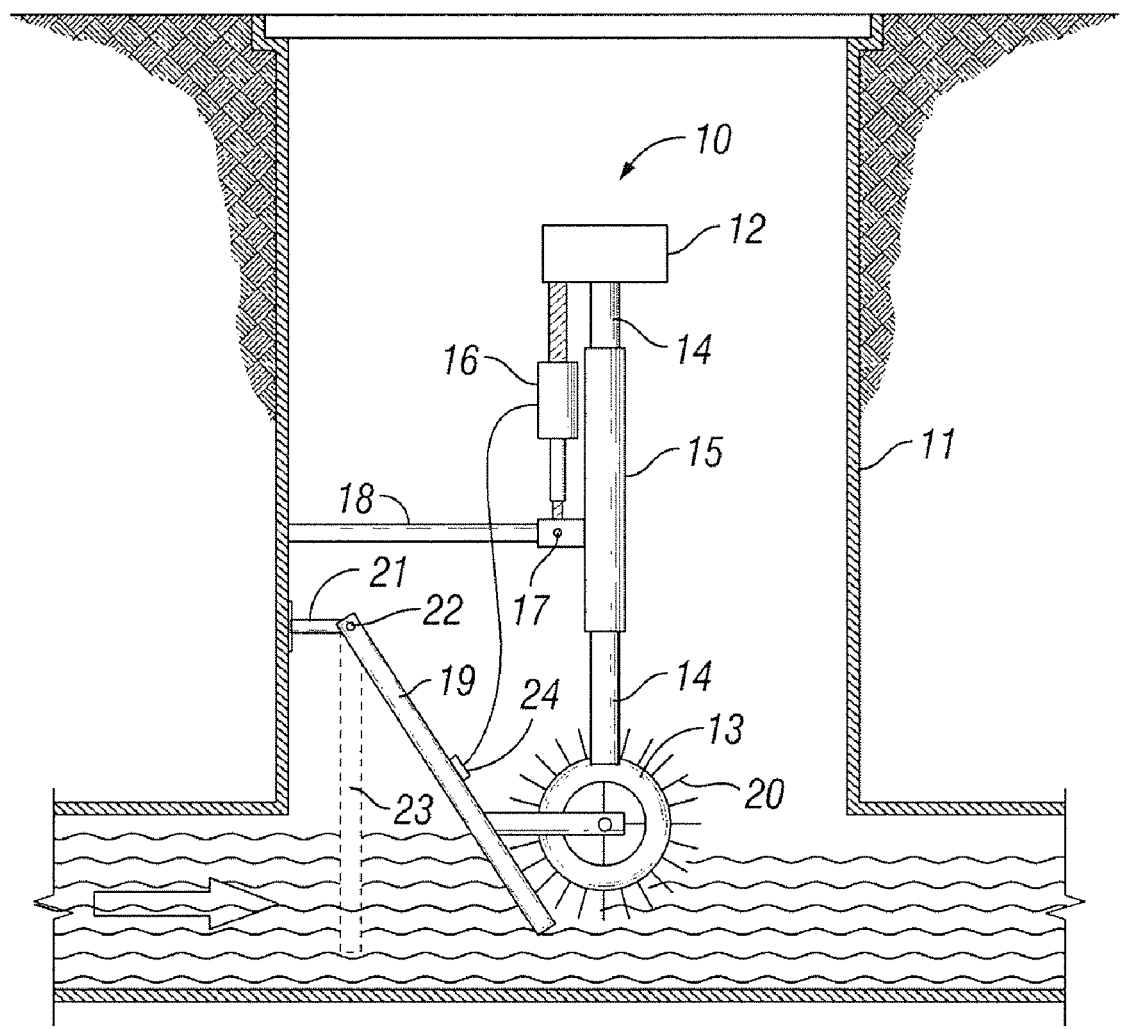
FIG. 1 is a side view of the sewer line power generating system positioned in a manhole.

FIG. 1 shows the preferred embodiment of a sewer power generating system (10) positioned within a manhole (11). Power generating system (10) is shown sized to fit within a manhole, but it is understood it can be scaled for different applications and sewer sizes. Power generating system (10) includes an alternator (12) connected to hydro turbine (13). Hydro turbine (13) is attached to shaft housing (14). Shaft housing (14) is positioned within guide (15). Shaft housing (14) is designed to slide within guide (15). Shaft housing (14) is moved by actuator (16). Actuator (16) is connected to alternator (12) on one side and guide pivot point (17) on the other. Guide (15) is mounted to the wall of the manhole by mounting rod (18). Although mounting rod (18) is shown, any number of mounting methods can be employed. Actuator (10) is offset from guide (15). As actuator (10) is extended or retracted, shaft housing (14) slides within guide (15) to lower or raise hydro turbine (13). As hydro turbine (13) is raised or lowered, guide (15) pivots about pivot point (17).

Hydro turbine (13) is attached to a flow control plate (19). Flow control plate (19) restricts water flow through the sewer in order to increase the flow velocity in the vicinity of hydro turbine (13). In the preferred embodiment, flow control plate (19) includes a flow control channel cutout (not shown). The flow channel cutout is a section in flow control plate (19) that helps control water flow. For example, the flow control channel allows water to be directed at the turbine blades (20) of hydro turbine (13). The flow control channel is shaped according to the shape and configuration of turbine blades (20). For example, in the split turbine blade configuration shown in FIG. 2, the flow control channel is shaped to direct water on both sides of turbine blade. Although the flow control channel can be defined by shaping the bottom of flow control plate (19), it can also be a cut-out or multiple cut-outs. Generally, however, the channel should be large enough to minimize clogging issues with sewer debris.

The flow control plate (19) is attached to the sewer wall by attachment fixture (21) through pivot point (22). As hydro turbine (13) is raised and lowered, flow control plate (19) pivots deeper into and out of the sewer pipe. When actuator (16) is in a retracted position, hydro turbine (13) is in its lowest position and flow control plate (19) is substantially straight down. In a straight down position (23) force from the water is maximized for a given flow. However, for higher flow rates, the force can be reduced and still be high enough force to turn turbine blades (20). Accordingly, hydro turbine (13) can be raised and lowered to keep the hydro force generally constant on the turbine blades (20). As the flow increases, actuator (16) expands and raises hydro turbine (13) and flow control plate (19) to maintain constant water force on flow control plate (19) and/or hydro turbine. Water pressure is monitored with a pressure sensor (24). Alternatively, the hydro turbine (13) can be raised and lowered based on power needs. In no event should hydro turbine be submerged past its axis of rotation. In an alternative embodiment, both the position of the flow control plate and the hydro turbine are independently moved by separate but coordinated actuators.

Actuator (16) is shown vertically, but one skilled in the art understands that is could be attached in any number of ways. The manner shown is designed to allow the system to be easily installed and removed. Nevertheless, other configurations are contemplated. For example, the actuator could be installed horizontally or at an angle. Alternatively, actuator could be connected directly to flow control plate (19) or any number of different locations. The common requirement is that the actuator be able to raise and lower hydro turbine (13).

Pressure sensor (24) is positioned to measure pressure at or near turbine blades (20). In one embodiment, pressure sensor (24) is connected to flow control plate (19). Pressure sensor (24) is shown connected to actuator (16). A control unit (not shown) receives signals from pressure sensor (24) and extends or contracts actuator (16) accordingly. Although the signal line is shown going to actuator (16), pressure sensor (24) can also be configured to send information to external monitoring locations or to save information. In this way, water flow through sewers can be monitored via power generating systems (10) strategically placed in different manholes.

In some applications, the reach of actuator (16) is limited in that it cannot extend turbine blades (20) low enough to reach the water during low flow periods. This prevents hydro turbine (13) from clogging the sewer line in low flow periods. Alternatively, flow control plate (19) and hydro turbine (13) can be configured to extend all the way to the bottom of the sewer pipe. In this configuration, flow control plate (19) and hydro turbine (13) combine to back up flow until enough water pressure is built up to turn turbine blades (20).

Figure 2:
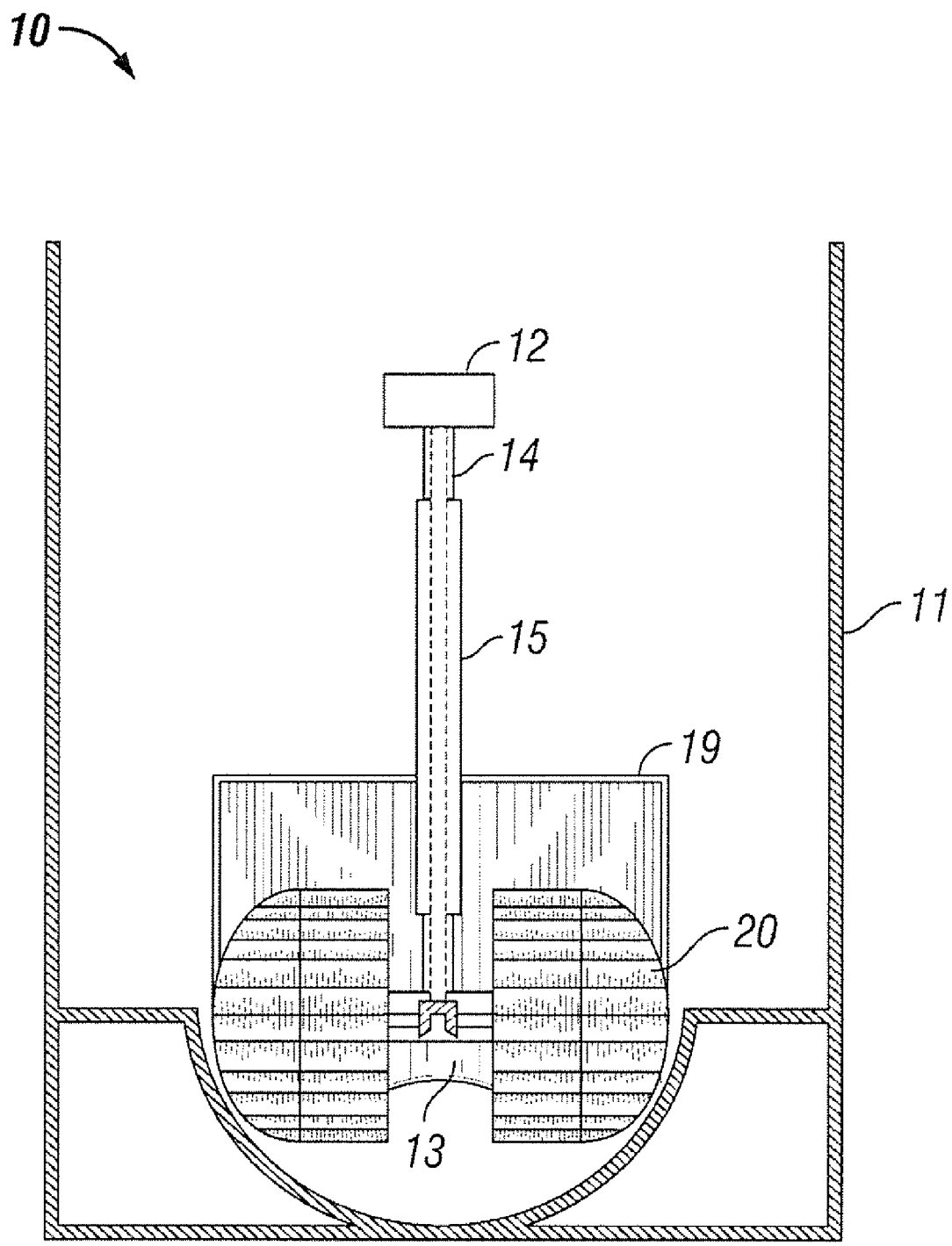
FIG. 2 is a front view of the sewer line power generating system positioned in a manhole.

FIG. 2 shows the power generating system (10) from the front view. The system is shown positioned in a section of sewer pipe running through manhole (11).

Power generating system (10) is shown with actuator (16), mounting rod (18), guide (15) and shaft housing (14). However, in an alternative embodiment, hydro turbine (13) can be mounted directly to flow control plate (19). In this configuration, the water force exerted on turbine blades (20) is controlled by the weight of the hydro generator (13). The water force and weight of the hydro generator (13) are designed to be in equilibrium at a desired water force. In such a configuration, additional weight can be added to flow control plate (19) or a spring can be added at pivot point (21) to aid in establishing equilibrium.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the vehicles and the methods described in the specification. Accordingly, the appended claims are intended to include within their scope such articles and methods.

What is claimed is:

1. A sewer line hydro power generator system comprising,
   a flow control plate shaped to be received in a sewer line, wherein said flow control plate includes a flow control channel;
   an attachment hinge pivotally connected to said flow control plate, wherein said flow control plate pivots about said attachment hinge to control water velocity through the sewer line;
   a hydro turbine connected to said flow control plate and positioned relative to the flow control channel; and
   an alternator connected to said hydro turbine.

2. The sewer line hydro power generator system of claim 1 wherein the water force needed to pivot said control plate is constant.

3. The sewer line hydro power generator system of claim 1, further including a pivot spring attached to said attachment hinge and said flow control plate.

4. The sewer line hydro power generator system of claim 3, wherein said alternator is attached to said flow control plate.

5. The sewer line hydro power generator system of claim 4, wherein said hydro turbine includes turbine blades.

6. The sewer line hydro power generator system of claim 4, wherein said flow control plate has a width that is substantially equal to the diameter of a sewer pipe.

7. A sewer line hydro power generator system comprising,
   a turbine shaft housing with an upper end and a lower end;
   a hydro turbine connected to the lower end of said turbine shaft housing;
   an alternator connected to the upper end of said turbine shaft housing;
   a flow control plate with an up-steam side and a down-stream side, wherein said hydro turbine is positioned on the down-stream side of said flow control plate;
   a pressure sensor mounted on said flow control plate; and
   an actuator configured to raise and lower said hydro turbine in response to water force acting on said flow control plate.

8. The sewer line hydro power generator system of claim 7, wherein said hydro power generator comprises turbine blades sized to fit within the diameter of a sewer pipe.

9. The sewer line hydro power generator system of claim 8, wherein said turbine blades extend below said flow control plate.

10. The sewer line hydro power generator system of claim 8, wherein said flow control plate has a flow channel and said hydro turbine is positioned relative to the flow channel.

11. The sewer line hydro power generator system of claim 8, further comprising, an attachment hinge pivotally connected to said flow control plate.

12. The sewer line hydro power generator system of claim 11, wherein the clearance between said turbine blades and the sewer pipe is approximately ¼ inch.

13. The sewer line hydro power generator system of claim 12, wherein said turbine blades are shaped to match the curvature of the sewer pipe.

14. The sewer line hydro power generator system of claim 13, wherein said flow control plate is releaseably attached to said hydro power generator.

15. The sewer line hydro power generator system of claim 11, wherein said turbine shaft housing is sized such that at its maximum extension said turbine blades are not in the water during normal sewer flow rates.

* * * * *